United States Patent [19]

Suzuki et al.

[11] Patent Number: 4,879,788

[45] Date of Patent: Nov. 14, 1989

[54] DRAWING MACHINE

[75] Inventors: Tsutomu Suzuki; Tatsushi Seko; Kuniharu Tobita; Saburo Matsubayashi; Nobuhiko Kougo; Kiyoshi Ogawa, all of Nagoya; Susumu Taniguchi, Nagasaki; Masaharu Minami, Takasago; Masayuki Hayakawa, Nagoya; Noriyuki Kawada, Hiroshima, all of Japan

[73] Assignee: Mitsubishi Jukogyo Kabushiki Kaisha, Tokyo, Japan

[21] Appl. No.: 233,922

[22] Filed: Aug. 17, 1988

Related U.S. Application Data

[63] Continuation of Ser. No. 876,200, Jun. 19, 1986, abandoned.

[30] Foreign Application Priority Data

| Jun. 25, 1985 | [JP] | Japan | 60-138121 |
| Aug. 19, 1985 | [JP] | Japan | 60-181280 |
| Aug. 19, 1985 | [JP] | Japan | 60-181281 |
| Aug. 23, 1985 | [JP] | Japan | 60-184016 |
| May 8, 1986 | [JP] | Japan | 61-105534 |

[51] Int. Cl.$^4$ ............................................. D06C 3/04
[52] U.S. Cl. ....................................................... 26/94
[58] Field of Search .................. 26/72, 73, 79, 91, 93, 26/94, 95, 96; 104/283

[56] References Cited

U.S. PATENT DOCUMENTS

| 3,441,331 | 4/1969 | Kesling | 104/283 X |
| 4,142,469 | 3/1979 | Polgreen | 104/283 X |
| 4,324,185 | 4/1982 | Vinson | 104/283 |

FOREIGN PATENT DOCUMENTS

| 1114460 | 10/1961 | Fed. Rep. of Germany | 26/95 |
| 1704942 | 3/1972 | Fed. Rep. of Germany | |
| 2432900 | 1/1976 | Fed. Rep. of Germany | |
| 1461597 | 11/1966 | France | |
| 1561311 | 2/1969 | France | |
| 59-83624 | 5/1984 | Japan | 26/93 |
| 59-135127 | 8/1984 | Japan | 26/93 |
| 1165955 | 10/1969 | United Kingdom | |
| 2159186 | 11/1985 | United Kingdom | 26/95 |

Primary Examiner—Robert R. Mackey
Attorney, Agent, or Firm—Wenderoth, Lind & Ponack

[57] ABSTRACT

This invention provides a drawing machine for pinching and stretching a film-like material of the type having rails installed extending from an inlet section to the outlet section and returning in the opposite direction from the outlet section back to the inlet section of the drawing machine. There is a clip propelling unit moving on the rails for pinching and stretching the film-like material, and elements for generating mutually repelling magnetic fields between the rails and clips, whereby the clips are movable in the non-contact state while floating from the rail guide surfaces. Thus, no foreign substances are generated, cleanliness of products is enhanced, no noise is generated, the work environment is improved, energy is saved, and highspeed operation is attained.

2 Claims, 20 Drawing Sheets

DRAWING MACHINE

This application is a continuation of now abandoned application Ser. No. 876,200, filed June 19, 1986, now abandoned.

BACKGROUND OF THE IANVENTION

1. Field of the Invention

This invention relates to various types of drawing machines, such as tenters for processing a strip material, e.g. cloth or film, horizontal drawing machines used, for example, in a serial biaxial drawing line, and simultaneous biaxial drawing machines.

2. Description of the Prior Art

Drawing machines of the above type used widely hitherto will first be described briefly with reference to FIG. 5 which is a plan view of a somewhat schematic outline of drawing machines in general.

In this drawing, reference numeral 1 indicates a strip material (hereinafter referred to as a film) such as a film, which is stretched in the cross direction by the drawing machine. Reference numeral 2 indicates a pair of endless rails which are disposed fixedly on either side of the film to be stretched. Referencenumeral 3 indicates a number of paired clips mounted slidably on the pair of clips 3 arranged on either rail 2 are interlinked mutually by, for example, a roller chain in an endless fashion.

At the time of stretching, both selvage edges of the film 1 are pinched by the clips 3 in the inlet section A of the drawing machine, the film 1 is stretched in response to separation of the paired confronting clips 3 from each other while the clips are moving in the direction of the arrow C along the rails 2. The clips 3 release their pinching action in the outlet section B of the drawing machine, and the film 1 alone is sent outward from the drawing machine, while the clips 3 move successively along the outer path of each rail in the direction of the arrow E, and return to the inlet section A after circulating on the rails 2. The foregoing stretching action is then repeated.

The slide type drawing machine and the roller type drawing machine which are typical will now be described in detail.

Describing first the slide type drawing machine shown in FIG. 6, 1 is the film, and 5 is a clip body mounted on a clip base 8. 6 is a clip lever attached to the clip body 5 rotatably via a pin 7. The clip base 8 is substantially the rotated form of a letter U in cross section, whose concave portion accommodates a roller chain 9, so that each clip base is interlinked with adjoining clip bases 8. 10 is a rail body having an H-shaped cross section, the three faces of whose upper concave portion have respective slide sustaining plates 11, 12, and 13 secured thereto, so that the three faces of the clip base 8 are guided slidably.

Describing the action, the clip bases 8 are interlinked with one another in an endless fashion by the roller chain 9 and while keeping the synchronized relation between the left and the right sides, circulated continuously in the direction from the arrow C to the arrow E of FIG. 5 by means of a driving unit (not shown).

During the above operation, each clip lever 6 is pushed down in the inlet section A (FIG. 5) of the drawing machine by a clip lever lowering unit (not shown) to pinch the film 1 in conjunction with the surface K of the corresponding clip body 5, driven along the rail 2 in the direction of the arrow C of FIG. 5 to stretch the film 1, and in the outlet section B (FIG. 5) of the drawing machine, pushed up by a clip lever raising unit (not shown) to release the pinched state of the film 1.

The slide sustaining plates 11, 12, and 13 provided over the whole length of the rail body 10 allow sliding of the clip bases 8 while, supporting the stretching force of the film 1, the weight of the clips, and the like. Meanwhile, sliding surfaces L, M, and N are oiled by an oiling unit (not shown) to bring about lubrication.

Describing now the roller type, FIG. 7 shows the conventional roller type drawing machine, in which 1 is the film, 20 is a clip body, and adjoining clip bodies 20 are interlinked mutually by means of a roller chain 26. The clip body 20 of the roller type drawing machine has three rollers 23, 24 attached rotatably to respective vertical shafts 23a, 24a in such a way that these three rollers hold a vertically-erected main roller support 28 therebetween. There is one roller 25 supported by a horizontal shaft 25a in such a way that it rolls on the horizontal surface of a rail body 27 on the side of the film 1. 21 is a clip lever which is attached rotatably to the clip body 20 via a pin 22.

29 is a rail receiver for supporting fixedly the rail bodies 27, 27a and the main roller support 28 erected between the former two.

In the roller type drawing machine of the foregoing configuration, its pinching and stretching action against the film 1 is identical to that of the foregoing slide type drawing machine; but, in this type of drawing machine the main roller support 28 provided over the whole length of the rail bodies 27, 27a supports the stretching force of the film 1 or the like, while the weight of the clips is received by the surface P of the rail body 27.

Meanwhile, the respective rolling surfaces P and R are oiled by an oiling unit (not shown) for lubrication.

Because the manufacturing process of the film being stretched and manufactured by the use of such a drawing machine is also adapted to manufacturing, for example, base films of material for condensors, and base films for photographs, a very high degree of cleanliness is demanded. In this connection, the conventional drawing machine, especially the slide type drawing machine, has the severe problem that the film is contaminated by dispersion of the lubricant.

Further, in the conventional drawing machine, noise is generated from the rolling surfaces and the sliding surfaces, thereby remarkably worsening the work environment. Especially, in the case of the slide type drawing machine, the problem that the consumption of power is extremely large owing to friction on the sliding surfaces arises.

Therefore, even if it is planned to operate the conventional drawing machine at a low energy consumption while keeping high the degree of cleanliness and of quietness, it is impossible to realize higher operating speeds.

As described hereinabove, according to the conventional drawing machines of these types, the scattering of lubricant and dust is severe while the machine is operating; as a result of such scattering, the quality of products is lowered and the work environment becomes worse. In addition, because the machine has a number of sliding portions owing to its peculiar configuration, noise is generated through sliding and contacting action, and power and energy losses become remarkably large in view of the sliding resistance.

Moreover, the foregoing problems become more severe at higher operating rates.

SUMMARY OF THE INVENTION

The present invention has been devised to solve the foregoing problems of the prior art. Its object is to provide a drawing machine capable of reducing the sliding action between clips and rails and the surface pressure between their sliding surfaces to achieve oil-free operation, thereby realizing high speed, energy-saving, and quiet.

To achieve the foregoing object, the present invention provides a drawing machine comprising rails installed extending from the inlet section to the outlet section and returning in the opposite direction from the outlet section back to the inlet section of the drawing machine, and a clip propelling unit moving on the rails for pinching and stretching a film-like material, and elements for generating mutually repelling magnetic fields between the rails and clips, whereby the clips are movable in the non-contact state while floating from the rail guide surfaces.

According to another feature of the present invention, there is provided a drawing machine comprising rails installed extending from an inlet section to the outlet section and returning in the opposite direction from the outlet section back to the inlet section of the drawing machine. Also, a clip propelling unit moving on the rails for pinching and stretching a film-like material, has elements for generating mutually repelling or attracting magnetic forces provided between the clips and the rails to reduce the surface pressure between the clips and the rails caused by the tension in the cross direction of the film-like material.

According to still another feature of the present invention, there is provided a drawing machine comprising rails installed extending from the inlet section to the outlet section and returning in the opposite direction from the outlet section back to the inlet section of the drawing machine, and a clip propelling unit moving on the rails for pinching and stretching a film-like material, and a magnetic floating device including means provided between the rails and clips for generating mutually repelling or attracting magnetic forces, whereby the clips are floated from the rail guide surfaces, except for portions of the rail guide surfaces supporting either the whole weight of the clips or a part thereof and are movable while maintaining the non-contact state.

According to a further feature of the present invention, there is provided a horizontal drawing machine for pinching the selvage edges of a film-like strip material and continuously stretching laterally the strip material in the cross direction, comprising clip bodies for pinching and releasing the strip material and self-holding their resultant state, clip levers mounted swingably on the clip bodies each having a permanent magnet secured to its top, and clip closers and clip openers each having a magnetic pole repulsive with the permanent magnet, wherein oscillation of the clip levers is driven by the repulsive force of magnetism to thereby pinch and release the strip material.

According to a still further feature of the present invention, there is provided a drawing machine comprising rails installed extending from an inlet section to the outlet section and returning in the opposite direction from the outlet section back to the inlet section of the drawing machine, and a clip propelling unit moving on the rails for pinching and stretching a film-like material having elements for generating magnetic fields between the rails and clips, wherein the magnetic fields generated by the generating means include vertically repulsive or attractive magnetic fields and horizontally attractive magnetic fields, and the clips are movable in the non-contact state while floating from the rail guide surfaces.

BRIEF DESCRIPTION OF THE DRAWINGS

FIGS. 16 through 19 show an embodiment according to the fourth feature of the present invention, in which FIG. 16 is a fragmentary vertical sectional view showing the film-pinching operation in the inlet section of a horizontal drawing machine, FIG. 17 is a view in the direction of the arrow I in FIG. 16, FIG. 18 is a fragmentary vertical sectional view showing the film-releasing operation in the outlet section of the horizontal drawing machine, and FIG. 19 is a view in the direction of the arrow II in FIG. 18;

FIGS. 24 and 25 show an embodiment according to the fifth feature of the present invention, in which FIG. 24 is a fragmentary vertical sectional view showing the film-pinching operation in the inlet section of the drawing machine, and FIG. 25 is an enlarged sectional view of an important portion of the machine shown in FIG. 24.

DESCRIPTION OF THE PREFERRED EMBODIMENTS

Figure 1:
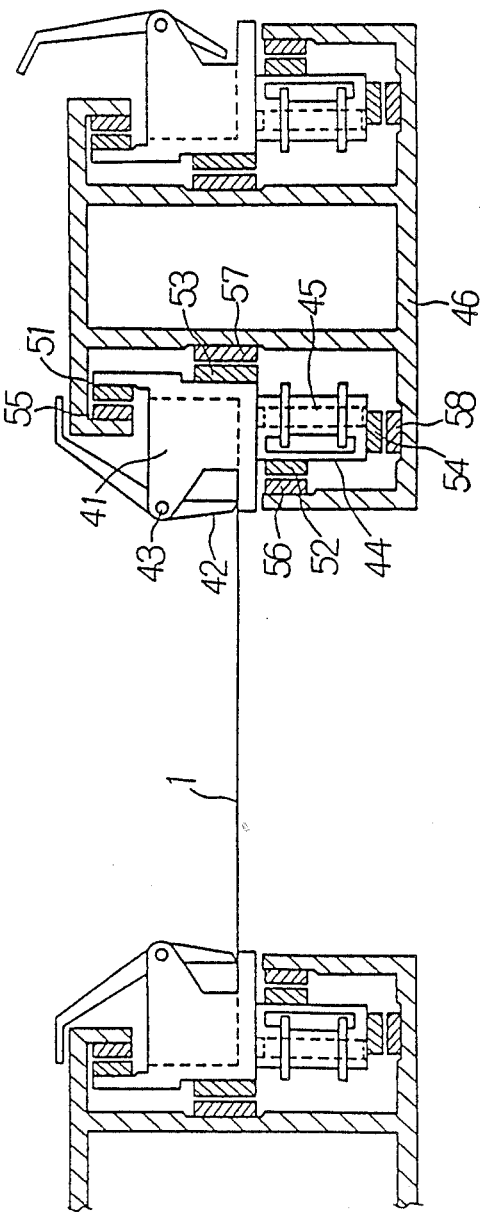
FIG. 1 is a fragmentary sectional view of a slide type drawing machine which is an embodiment according to the first feature of the present invention.
Figure 2:
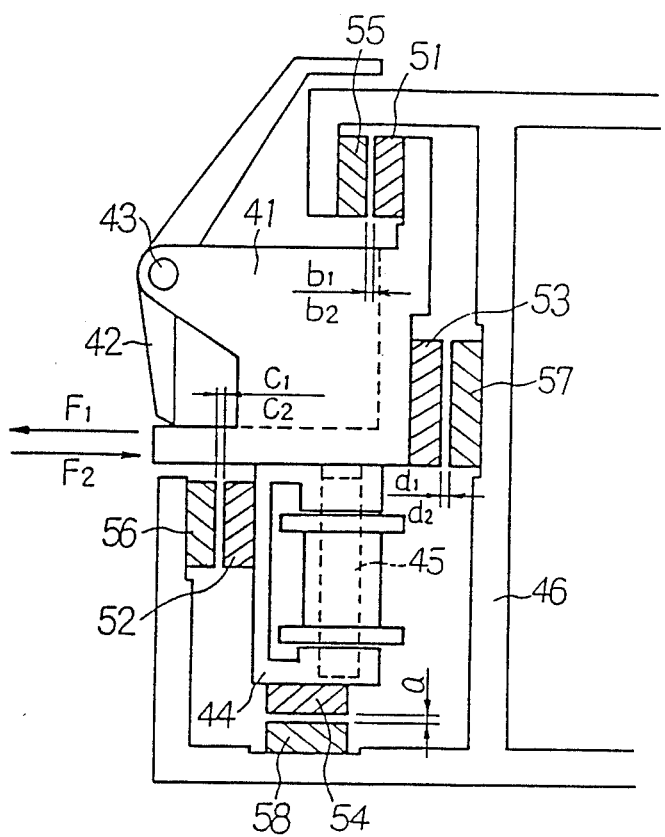
FIG. 2 is an enlarged sectional view showing an important portion of the machine shown in FIG. 1.
Figure 3:
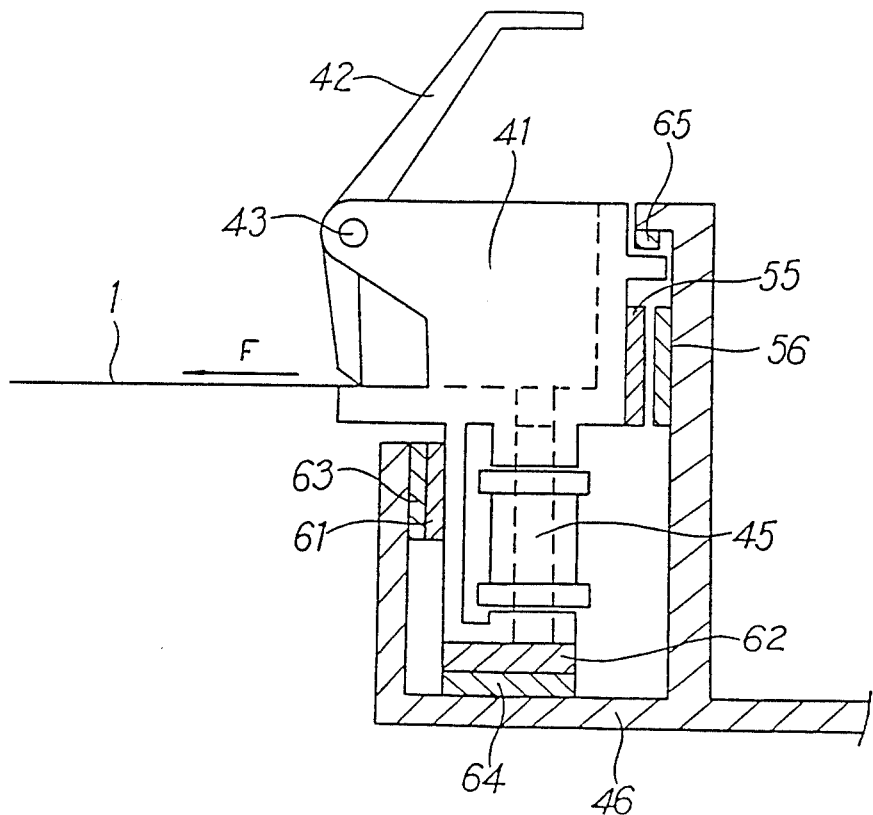
FIG. 3 is an enlarged sectional view showing the important portion of another embodiment of the same type as that of FIG. 1.
Figure 4:
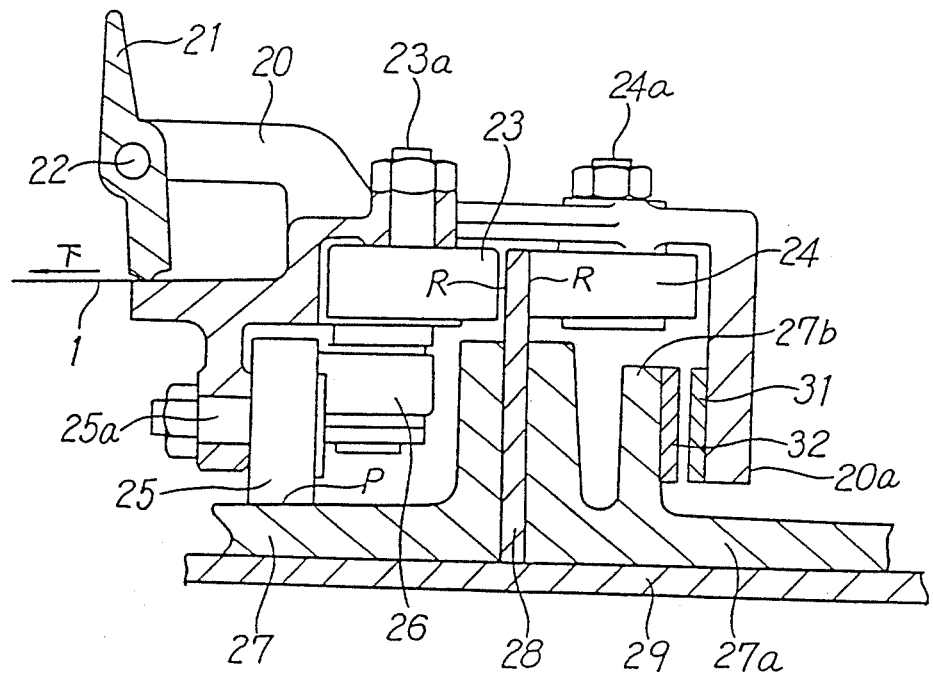
FIG. 4 is an enlarged sectional view showing an important portion of a roller type drawing machine which is still another embodiment.
Figure 5:
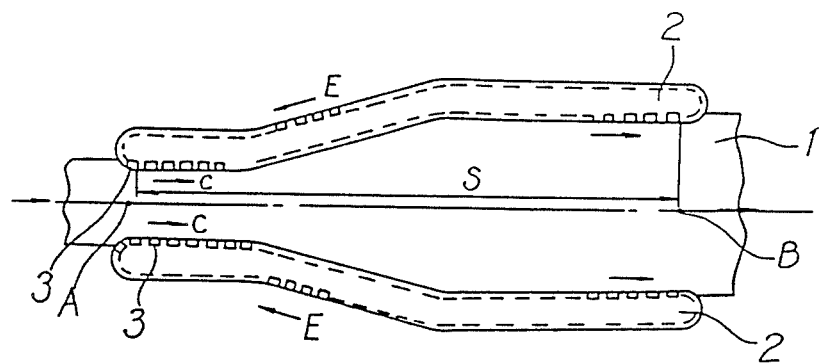
FIG. 5 is a plan view of a somewhat schematic outline of drawing machines in general.

Embodiments according to the first feature of the present invention will now be described with reference to the drawings. FIGS. 1 and 2 show an embodiment according to the first feature of the present invention, that is a drawing machine comprising rails 46 installed extending from the inlet section up to the outlet section and returning from the outlet section back to the inlet section of such a machine as shown in FIG. 5, and a clip propelling unit including clip bodies 41, clip levers 42, etc. movable on the rails 46 for pinching and stretching, for example, the film 1. This drawing machine has the following characteristics.

That is, the clip body 41 has permanent magnets 51, 52, 53, and 54 attached thereto, as magnetic generating units. Of course, these permanent magnets 51–54 can be replaced by means for generating magnetism, such as electromagnets. The rail 46 has permanent magnets 55, 56, 57, and 58 attached thereto in correspondence to the permanent magnets 51–54, as the magnetic generating units, which generate repulsive magnetism. Of course, these permanent magnets 55–58 can also be replaced by means for generating magnetism, such as electromagnets.

The machine is designed so that the clip body 41 and a clip base 44 can float by means of the magnetic forces of the permanent magnets 51–54 and the permanent magnets 55 through 58 repulsive with the former. The clip bases 44 are interlinked mutually by a roller chain 45 and driven by a driving system (not shown) so as to move on the rail 46 in synchronized relation between the left and the right sides. 43 is a pin for supporting rotatably the clip lever 42.

Figure 6:
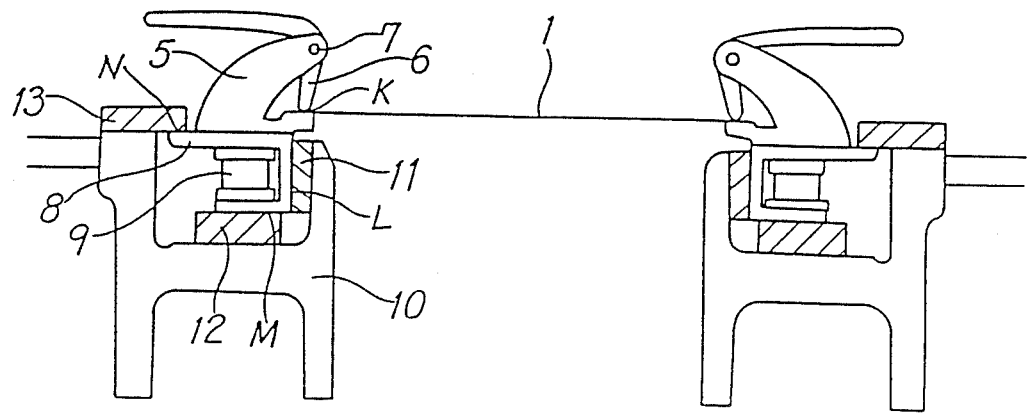
FIG. 6 is a sectional view taken in the direction orthogonal to the advancing direction of a film, showing a prior art slide type drawing machine.

Describing the action of the embodiment of the foregoing configuration, the clip lever 42 is lowered in the inlet section A (FIG. 5) of the drawing machine by a clip lever lowering unit (not shown) to pinch the film 1 in conjunction with the surface K (such as shown in FIG. 6) of the clip body 41, and driven along the rail 46 in the direction of the arrow C of FIG. 5 by a driving unit not shown to stretch the film 1. Then, in the outlet section B (FIG. 5) of the drawing machine, the clip lever 42 is pushed up by a clip raising unit (not shown) to remove the pinched state of the film 1.

During the above, the clip body 41 and the clip base 44 are floated by means of the mutually repulsive magnetic forces generated by the permanent magnets (the magnetic generating units) 51–54 and 55–58, and moved along the rail 46 in the non-contact state.

The equilibrium relation of the system comprising the permanent magnets 51–58 will now be described with reference to FIG. 2. The total weight of the movable portions (the floatable portions), such as the clip body 41, clip base 44, and roller chain 45, is floated by the repulsive force between the permanent magnets 54 and 58, thereby forming a gap a.

In case some force acts, on the clip body 41 in the direction of the arrow $F_1$ owing to the stretching action and the like or to the tension of the roller chain 45 appearing in the curved section of the rail, the system becomes balanced at the position where the resultant force of the force acting on the clip body and the repulsive force generated by the permanent magnets 53 and 57 equalizes with the resultant force of the repulsive forces generated by the permanent magnets 51 and 55, and 52 and 56. At this time, gaps $b_1$, $c_1$, and $d_1$ are formed between the respective permanent magnets.

Also, in case some force acts on the clip body 41 in the direction of the arrow $F_2$ due to the tension of the roller chain 45 appearing in the curved section of the rail, the system becomes balanced at the position where the resultant force of the force acting on the clip body and the repulsive forces generated by the permanent magnets 51 and 55, and 52 and 56 equalizes with the repulsive force between the permanent magnets 53 and 57. At this time, gaps $b_2$, $c_2$ and $d_2$ are formed between the respective permanent magnets. Of course, without relying upon a change of each gap, it is also possible to maintain a balance by controlling the repulsive force of the magnetic generating unit by changing, for example, the electrical current if an electromagnet, for instance, is used.

The effects of this feature are summarized at the end of the description.

Embodiments according to the second feature of the present invention will now be described with reference to the drawings.

Figure 8:
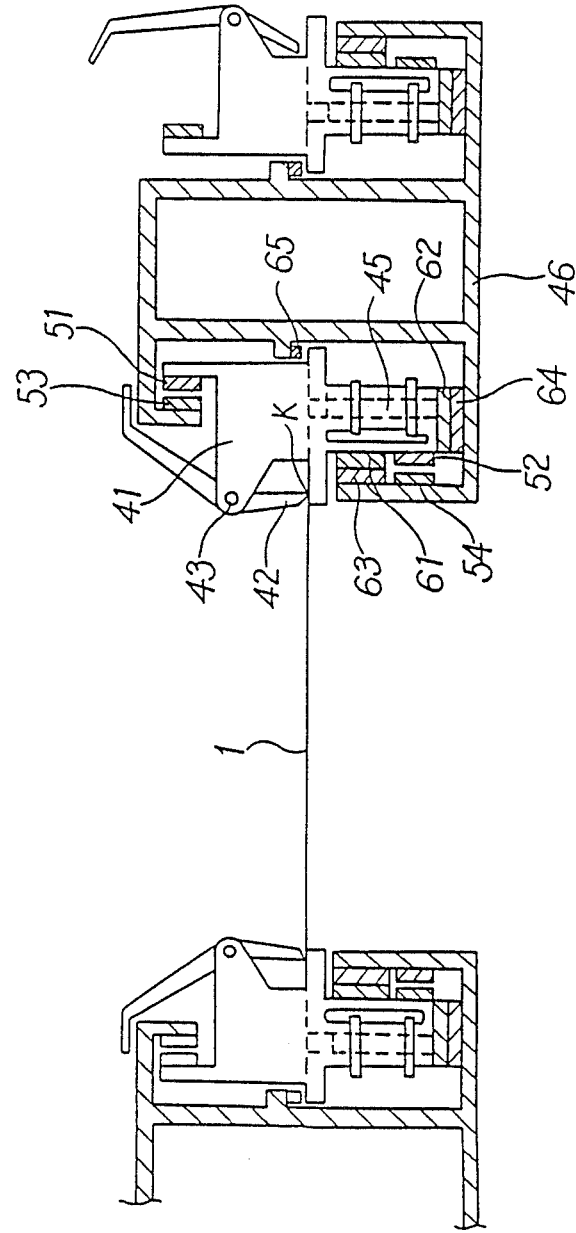
FIG. 8 is a fragmentary sectional view of a slide type drawing machine which is an embodiment according to the second feature of the present invention.
Figure 9:
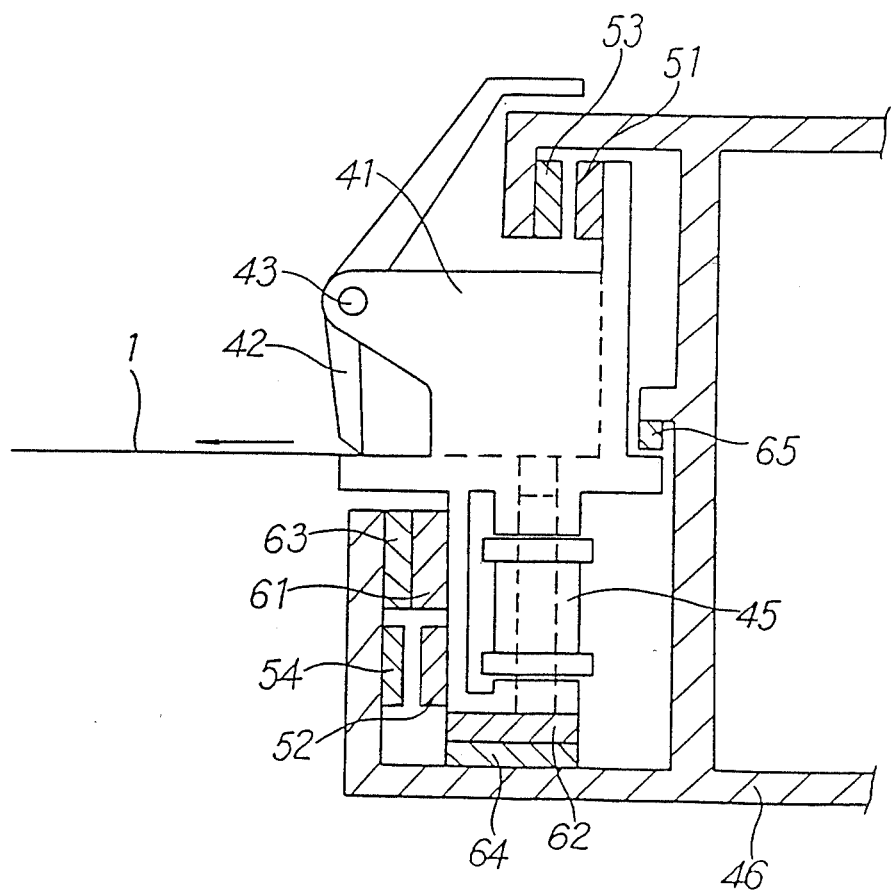
FIG. 9 is an enlarged sectional view of an important portion of the machine shown in FIG. 8.

FIGS. 8 and 9 show an embodiment of the slide type drawing machine to which the second feature of the present invention is applied, and in which the sectional shape of the rail 46 is designed so that it holds a portion of the clip body 41 not interfering with the clip lever 42. Clip sliding members 62 and 61 are secured, respectively, to the under face of the clip chain 45-attached portion of the clip body 41 and to the side face on the side of the clip lever 42 of that attached portion, and rail sliding members 64 and 63 are provided extending over the surfaces of the rail 46 confronting the respective clip sliding members 62 and 61.

Further, the magnetic force generating unit 52 such as a permanent magnet is secured below the clip sliding member 61 secured to the side face of the clip chain (45)-attached portion of the clip body 41, the magnetic force generating unit 54 such as a permanent magnet is similarly secured to the rail face opposite to the magnetic force generating unit 52, and the magnetic force generating units 51 and 53 such as permanent magnets are secured, respectively, to the rear erecting portion of the clip body 41 and to the upper projecting portion of the rail 46 in mutually confronting relation.

In this embodiment, the magnets attached to the clip body and the magnets attached to the rail are selected so that they receive forces in mutually repulsive directions.

The action of the foregoing configuration will now be described with reference to FIGS. 8, 9, and 5.

The clip lever 42 is lowered in the inlet section A (FIG. 5) of the drawing machine by a clip lever lowering unit (not shown) to pinch the film 1 in conjunction with the surface K (as in FIG. 6) of the clip body 41, the clip body 41 is driven by a driving unit (not shown) along the rail 46 in the direction of the arrow C of FIG. 5 to stretch the film 1. The clip lever 42 is pushed up in the outlet section B (FIG. 5) of the drawing machine by a clip raising unit (not shown) to release the pinched state of the film 1.

Within the range (S in FIG. 5) where the tension of the film acts on the clip body 41, the surface pressure between the sliding surfaces of the clip body 41 and the rail 46 is reduced owing to the mutually repulsive forces of the magnetic force generating units 51–54; thus, the clip body 41 is driven smoothly along the rail 46.

Figure 10:
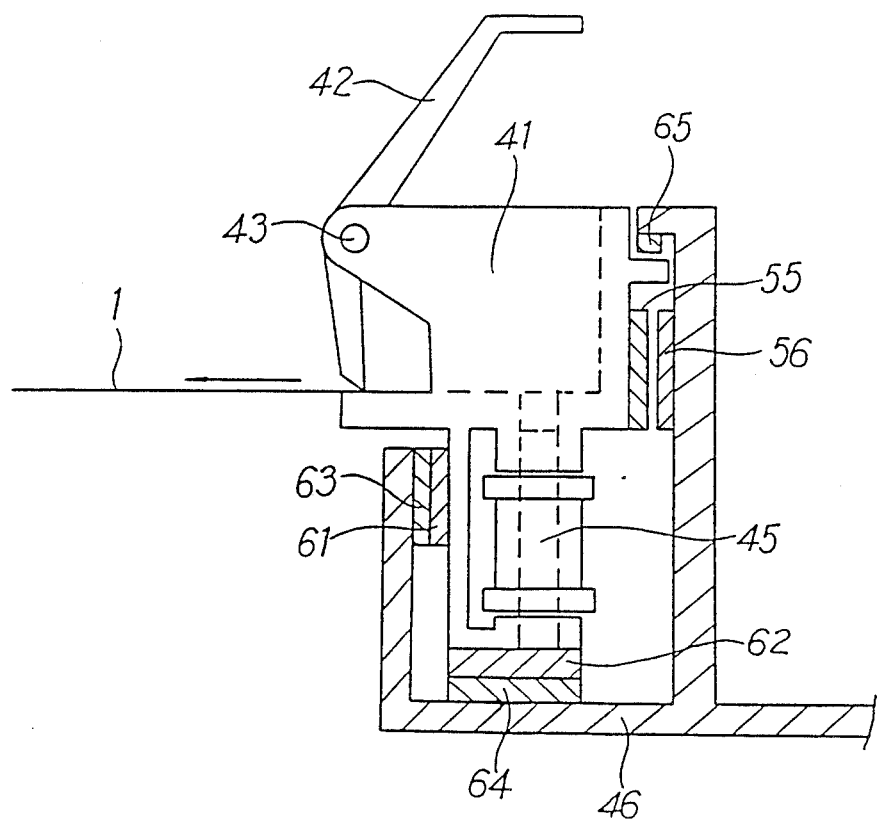
FIG. 10 is an enlarged sectional view of the important portion of another embodiment of the same type as that of FIG. 9.

For reference, even when mutually attractive magnetic force generating units are used as shown in FIG. 10 in place of the mutually repulsive magnetic force generating units 51 through 54 shown in FIG. 9, that is, even when the magnetic force generating unit (for example, a permanent magnet) 55 is secured to the rear side face of the clip body 41 and the magnetic force generating unit (for example, a permanent magnet) 56 is secured to the side of the rail 46 so as to confront mutually, the surface pressure between the sliding surfaces of the clip body 41 and the rail 46 can be reduced.

Figure 7:
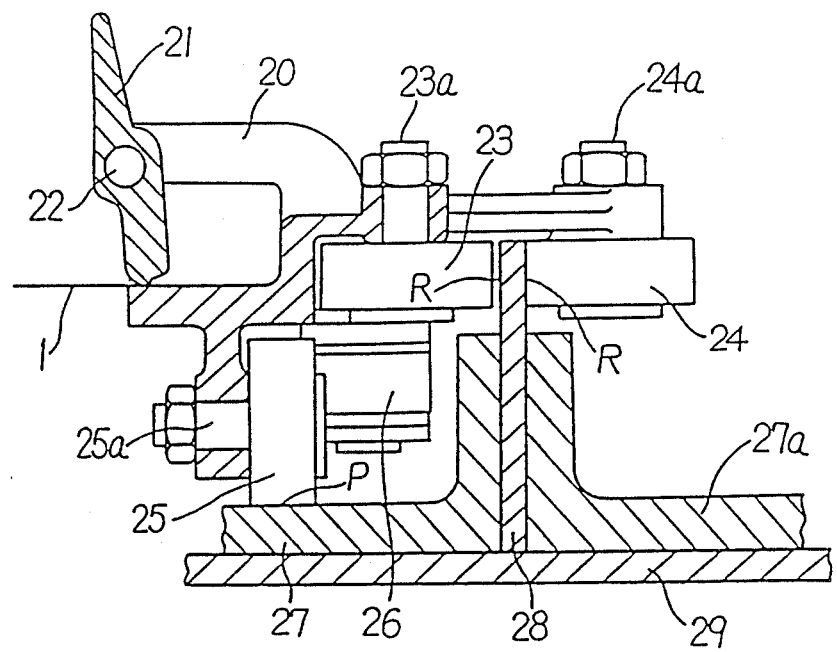
FIG. 7 is a sectional view of the conventional roller type drawing machine.
Figure 11:
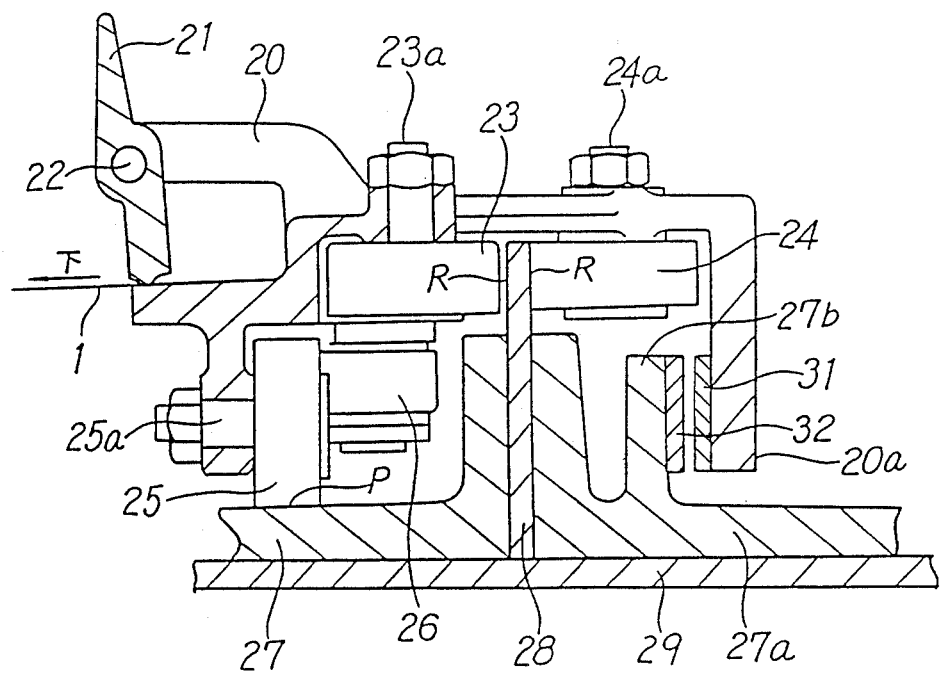
FIG. 11 is an enlarged sectional view of the important portion of a roller type drawing machine according to the second feature.

FIG. 11 shows a roller type drawing machine to which the second feature of the present invention is applied, in which a bracket 20a is provided on the clip body 20 of the conventional machine shown in FIG. 7 so as to project vertically therefrom, a vertical wall 27b is provided on a rail body 27a, and a clip-side magnetic force generating unit (for example, a permanent magnet) 3 and a rail-side magnetic force generating unit (for example, a permanent magnet) 32 functioning as mutually repulsive magnetic force generating units are attached, respectively, to the bracket 20a and the vertical wall 27b on their confronting sides to reduce the surface pressure of the rolling surface R between the main roller support 28 and the roller 24.

Although in the foregoing embodiments the permanent magnets are used as the magnetic force generating units, it is of course possible to use other types of magnetic force generating units, such as electromagnets. Further, to prevent the permanent magnets from coming into contact with each other, sliding members having a height slightly larger than the thickness of the magnets may be attached to the respective side portions of these magnets.

According to the second feature of the present invention described in detail hereinabove, the surface pressure caused by the film tension (the stretching force), which is the most prevailing cause among those for generating the contact surface pressure between the clip body and the rail, is reduced by means of the magnetic force; thus, the following effects are produced:

(1) little, abrasion powder is generated, oil-free operation is possible, the amount of foreign substance yielded through sliding or rolling action is reduced, and the degree of cleanliness of the film being stretched is improved.

(2) Sliding or rolling conditions are improved remarkably, and speed-up is attained easily.

(3) Sliding resistance is decreased, and energy-saving is realized.

(4) Noise generated through sliding or rolling action is reduced, and the work environment is improved.

Embodiments according to the third feature of the present invention will now be described with reference to the drawings.

Figure 12:
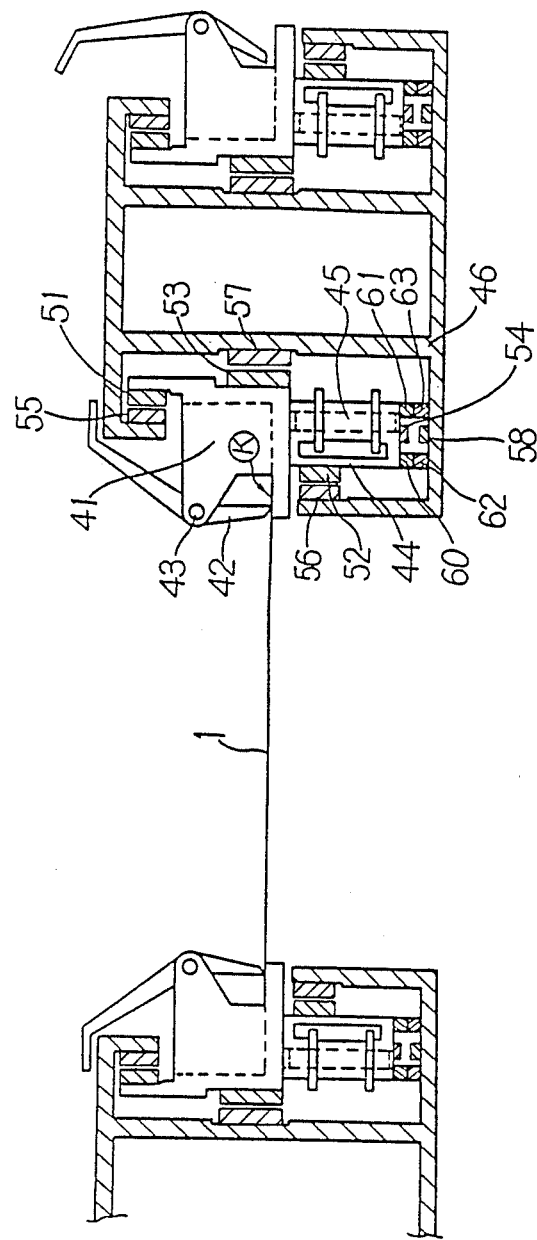
FIG. 12 is a fragmentary sectional view of a slide type drawing machine which is an embodiment according to the third feature of the present invention.
Figure 13:
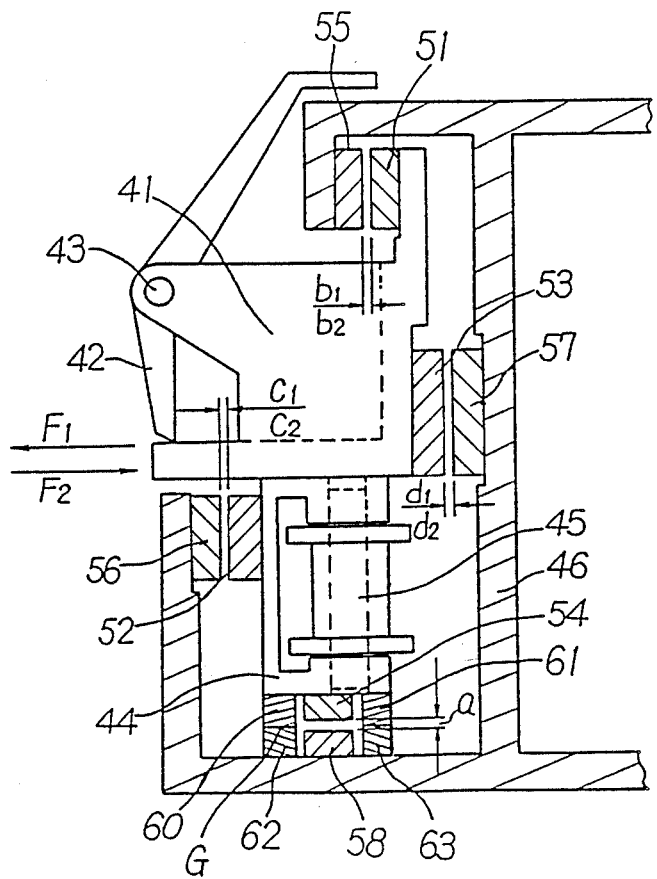
FIG. 13 is an enlarged sectional view of an important portion of the machine shown in FIG. 12.

FIGS. 12 and 13 show an embodiment of the slide type drawing machine to which the third feature of the present invention is applied, in which the sectional shape of the rail 46 is designed so that it holds a portion of the clip body 41 not interfering with the clip lever 42, clip-side sliding segments 60 and 61 are secured to the under face of the clip base 44 of the clip body 41, and rail-side sliding segments 62 and 63 are provided extending over the surface portions of the rail 46 confronting the respective clip-side sliding segments 60 and 61.

Further, the magnetic force generating units 51, 52, 53, and 54, such as permanent magnets, are secured to desired surface portions, opposite to the rail 46, of the clip body 41 and the clip base 44, and the magnetic force generating units 55, 56, 57, and 58, such as permanent magnets, are also secured to the surface portions of the rail opposite to the respective magnetic force generating units 51, 52, 53, and 54.

In this embodiment, the magnets attached to the clip body and the magnets attached to the rail are selected so that they receive forces in mutually repulsive directions.

The clip body 41 and the clip base 44 are floated by means of the magnetic forces of the permanent magnets 51–54 and the permanent magnets 55–58 repelling the former relatively. That is, the repulsive force between the magnet 54 secured to the under face of the clip base and the confronting magnet 58 is selected to be less than the total weight of the clip body 41, clip base 44, roller chain 45, etc. The repulsive force, thus, functions so as to reduce the surface pressures between the clip-side sliding segments 60 and 61 and the rail-side sliding segments 62 and 63. Of course, depending upon the weight, the magnet 54 on the under face of the clip base 44 and the confronting magnet 58 on the rail 46 can be omitted.

The clip bases 44 are interlinked mutually by means of the roller chain 45 and driven by a driving system (not shown) so as to move in synchronized relation between the left and the right sides. 43 is the pin for supporting rotatably the clip lever 42.

The action of the foregoing configuration will now be described with reference to FIGS. 12, 13, and 5.

The clip lever 42 is lowered in the inlet section A (FIG. 5) of the drawing machine by a clip lever lowering unit (not shown) to pinch the film 1 in conjunction with the surface K (as in FIG. 12) of the clip body 41, and driven along the rail 46 in the direction of the arrow C of FIG. 5 by means of a driving unit (not shown) to stretch the film 1, and the clip lever 42 is pushed up in the outlet section B (FIG. 5) of the drawing machine by a clip lever raising unit (not shown) to release the pinched state of the film 1.

During the above operation, the clip body 41 and the clip base 44 are floated by means of the mutually repulsive magnetic forces generated by the magnetic force generating units 51–54 on the clip side and the corresponding magnetic force generating units 55 through 58 on the rail side, so that all the members move along the rail 46 while maintaining the non-contact state, except for the sliding surface G owing to the weight.

The equilibrium relation of the system attained by the respective pairs of the magnetic force generating units 51–58 will be described with reference to FIG. 13.

The total weight of the movable portions, such as the clip body 41, clip base 44, and roller chain 45, is reduced by means of the repulsive force between the magnetic force generating unit 54 on the under face of the clip base 44 and the confronting magnetic force generating unit 58 on the surface of the rail 46 and supported by the respective sliding segments 60–63. Incidentally, the gap a is formed between the magnetic force generating units 54 and 58 to prevent direct contact thereof.

In case some force acts on the clip body 41 in the direction of the arrow $F_1$ owing to the stretching action and the like, or owing to the tension of the roller chain 45 appearing in the curved section of the rail, the system becomes balanced at the position where the resultant force of the force acting on the clip body and the repulsive force generated by the magnetic force generating units 53 and 57 on the back side (the right-hand side in the drawing) of the clip body 41 equalizes with the resultant force of the repulsive forces generated by the magnetic force generating units 51 and 55, and 52 and 56 on the front side (the left-hand side in the drawing) of the clip body 41. At this time, the gaps $b_1$, $c_1$, and $d_1$ are formed between the respective magnetic force generating units.

In case some force acts on the clip body 41 in the direction of the arrow $F_2$ owing to the tension of the roller chain 45 appearing in the curved section of the rail, the system becomes balanced at the position where the resultant force of the force acting on the clip body and the repulsive forces of the magnetic force generating units 51 and 55, and 52 and 56 on the front side of the clip body 41 equalizes with the repulsive force between the magnetic force generating units 53 and 57 on the back side of the clip body 41. At this time, the gaps $b_2$, $c_2$, and $d_2$ are formed between the respective magnetic force generating units.

Of course, without relying upon a change of each gap, it is also possible to maintain a balance by controlling the repulsive force of the magnetic force generating unit by changing, for example, a current.

Although in the foregoing description there are used the mutually-repellable magnetic force generating units, contrarily, it is also possible to use mutually-attractable magnetic force generating units.

Figure 14:
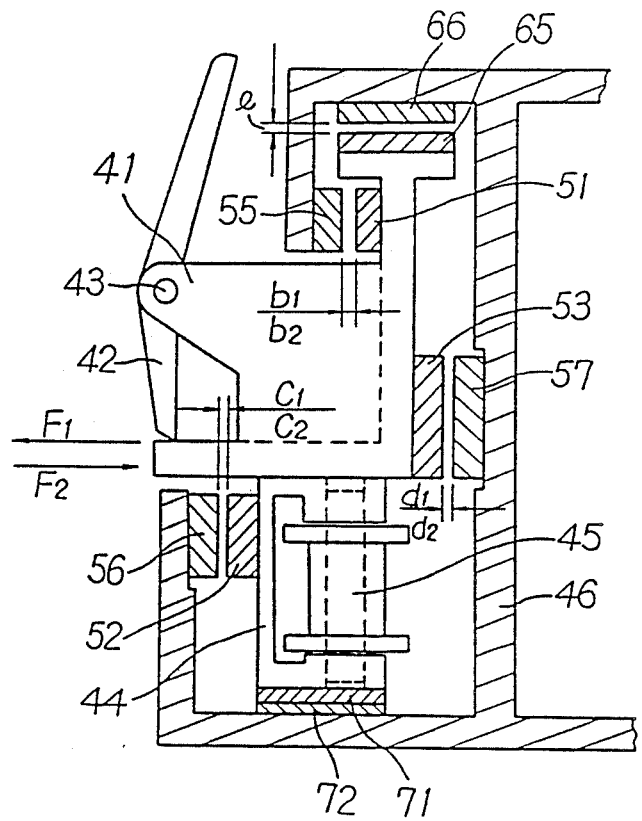
FIG. 14 is an enlarged sectional view of the important portion of another embodiment of the same type as that of FIG. 12.

Further, as shown in FIG. 14, it is also possible to omit the magnetic force generating units 54 and 58 and the sliding segments 60–63 provided in the under face section of the clip base 44 of the embodiment shown in FIG. 13, by providing in that section a clip-side sliding segment 71 and a rail-side sliding segment 72 and additionally attaching mutually-attractable magnetic force generating units 65 and 66, respectively, to the upper face of the back-side erected portion of the clip body 41 and to the surface of the rail 46 opposite to the former. In this case, a gap e is formed between the magnetic force generating units 65 and 66 to prevent direct contact thereof.

Figure 15:
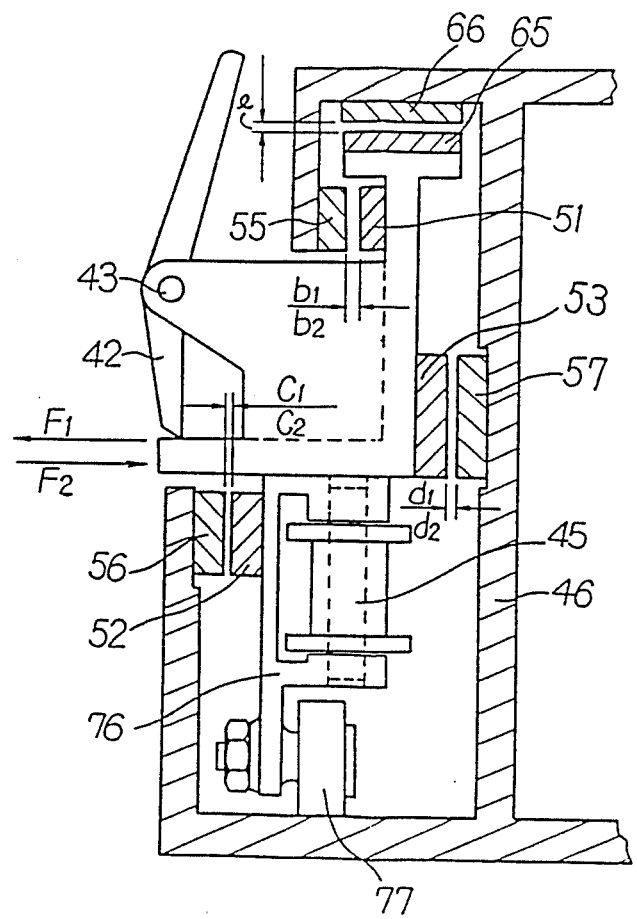
FIG. 15 is an enlarged sectional view of an important portion of still another embodiment of the same type as that above.
Figure 16:
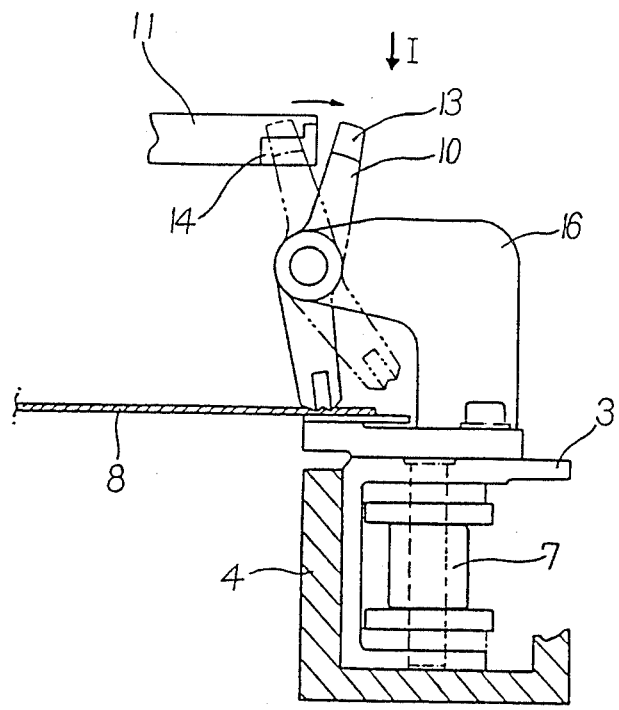
Figure 17:
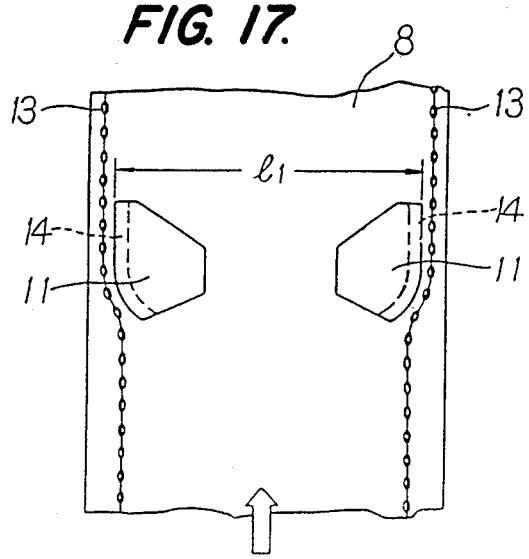
Figure 18:
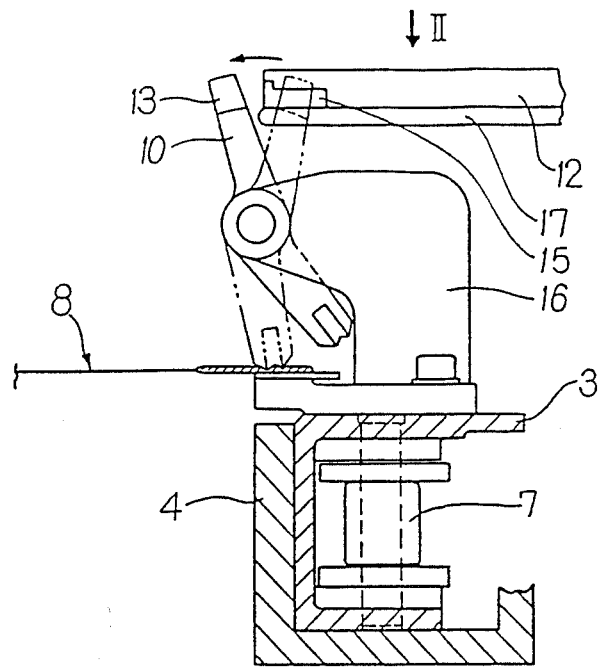
Figure 19:
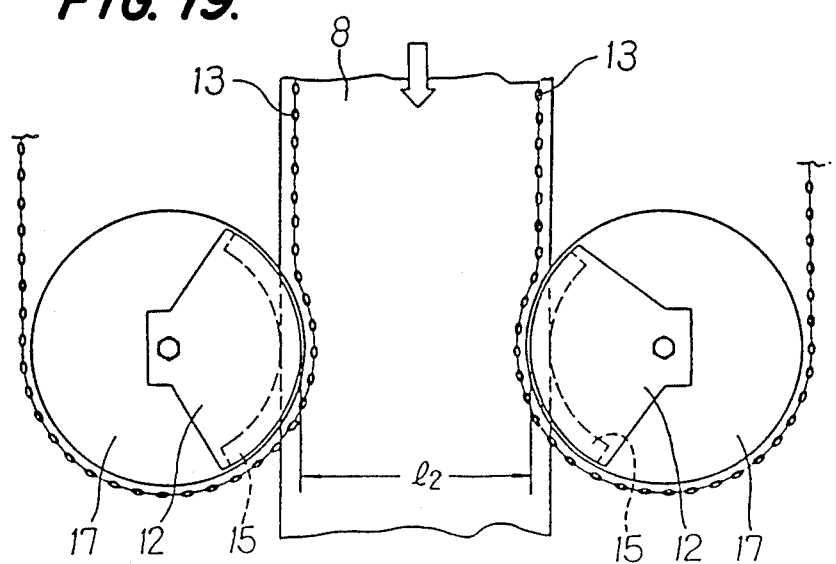
Figure 20:
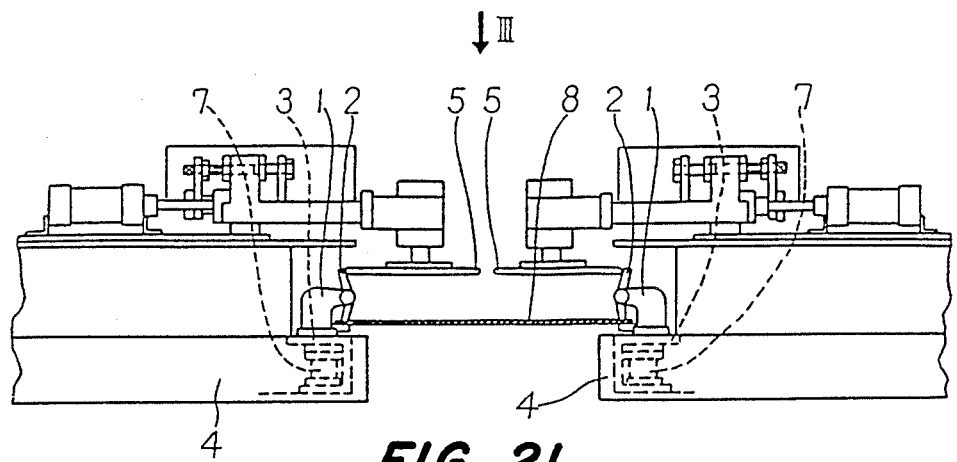
FIG. 20 is a fragmentary front view showing the film-pinching operation in the inlet section of a prior art horizontal drawing machine.
Figure 21:
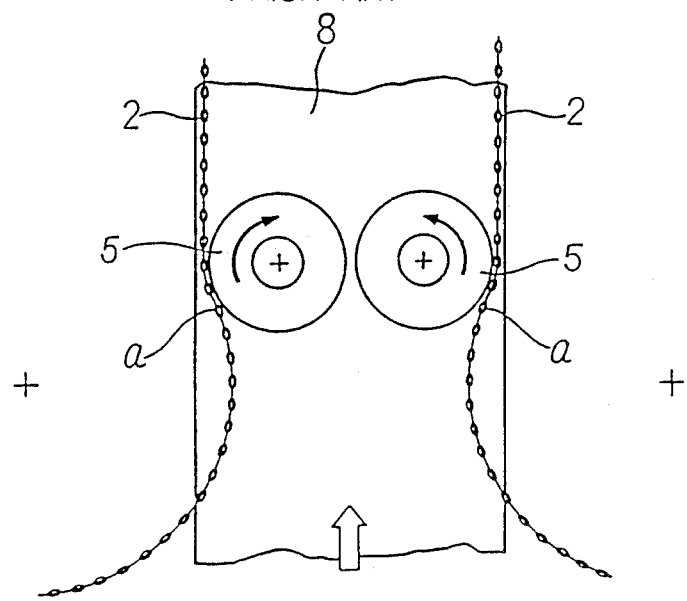
FIG. 21 is a view in the direction of the arrow III in FIG. 20.
Figure 22:
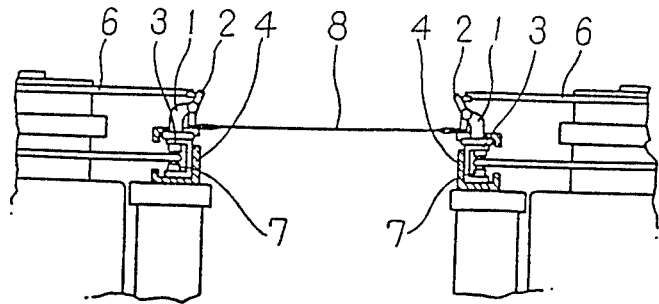
FIG. 22 is a fragmentary vertical sectional view showing the film-releasing operation in the outlet section of the prior art horizontal drawing machine of FIG. 20.
Figure 23:
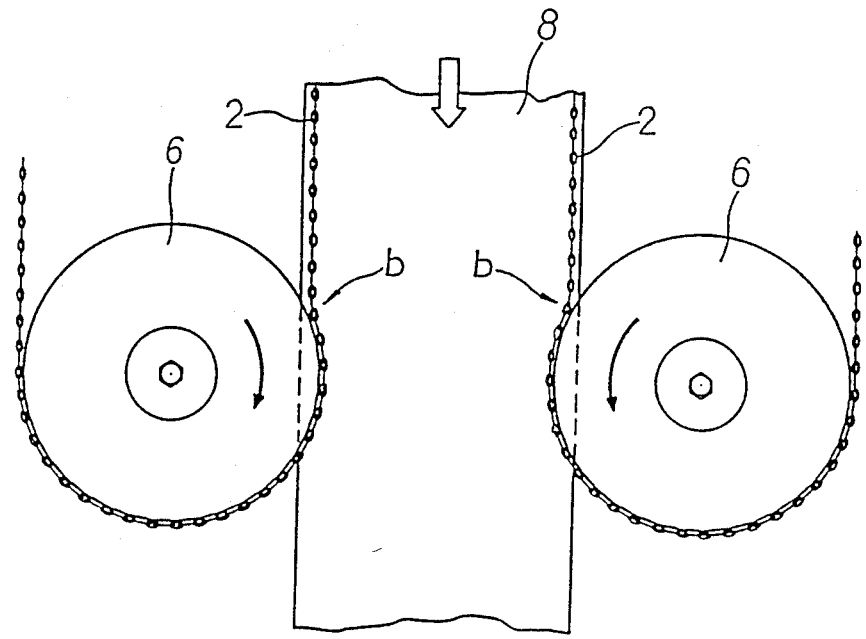
FIG. 23 is a view in the direction of the arrow IV in FIG. 22.

Furthermore, as shown in FIG. 15, it is also possible to attach a guide roller 77 to a clip base 76, in place of the sliding segments 71 and 72 included in the foregoing embodiment.

In the foregoing respective embodiments, to prevent the permanent magnets from coming into contact with each other, sliding members having a height slightly greater than the thickness of the magnets may be attached to the respective side portions of these magnets. Further, the magnetic force generating unit should not be limited to a permanent magnet; otherwise, an electromagnet, for example may be used.

According to the third feature of the present invention described in detail hereinabove, the weight of the clip and the like or a part thereof acts only on the contacting portions of the clip and the rail and the other portions are maintained in the non-contact state; thus, following effects are produced:

(1) The amount of foreign substance produced through lubrication, sliding and rolling action becomes very slight and oil-free operation is also realized; thus, the degree of cleanliness of the film being stretched is remarkably enhanced.

(2) Sliding and rolling conditions are improved remarkly, and a higher operating speed us attained easily.

(3) Sliding resistance is decreased, and energy-saving is realized.

(4) Noise generated through sliding or rolling action is reduced, and the work environment is improved.

An embodiment according to the fourth feature of the present invention will now be described with reference to the drawings. FIGS. 16 through 19 show the working state, at the time of pinching and releasing, of a clip mechanism and a clip lever of a horizontal drawing machine which is an embodiment of this fourth feature. For brevity, this embodiment will be described mainly with respect to its different points from the conventional machine shown in FIGS. 20 through 23.

10 is a clip lever having a permanent magnet 13 secured to its top, whose shape and other properties are identical to those of the conventional member. 11 is a clip closer, which is disposed in the inlet section of the horizontal drawing machine and made of a plate having a substantially sector-shaped portion and a straight portion continuing from the former, having a permanent magnet 14 secured on its edge opposite on the side of a film 8 to the permanent magnets 13 on the tops of the clip levers 10. There is included a pair of such clip closers 11 whose back portions confront each other in the cross direction of a film 8, with the spacing $l_1$ between the straight portions being made adjustable externally.

12 is a clip opener, which is disposed in the outlet section of the horizontal drawing machine and made of a sector-shaped plate, having a permanent magnet 15 secured on its arcuate portion opposite on the outside of the film 8 to the permanent magnets 13 on the tops of the clip levers 10, with this sector-shaped plate being mounted on a rotary disc 17 corresponding to the conventional clip opener. This disc 17 is designed so that the spacing $l_2$ between the arcuate faces of the clip openers 12 is made adjustable externally.

Of course, the permanent magnets 13 secured to the clip levers 10 and the permanent magnets 14 and 15 secured to the clip closers 11 and the clip openers 12 are selected so as to repel mutually.

The action of the foregoing configuration will now be described. The clip lever 10 of a clip body 16 circulating in the same manner as that of the conventional machine is turned in the inlet section of the horizontal drawing machine by means of the repulsive force between the permanent magnet 14 secured to the clip closer 11 and the permanent magnet 13 of the clip lever 10 to thereby maintain the film 8 in the pinched state by means of a mechanism not shown, such as a spring, accommodated in the clip body 16. As the clip body 16 pinching film 8 advances toward the outlet of the horizontal drawing machine, the permanent magnet 13 of the clip lever 10 comes opposite to the permanent magnet 15 of the clip opener 12, the clip lever 10 is turned in the opposite direction to that effected in the inlet section by means of the repulsive force of the mating magnet, and the film 8 is maintained in the released state by means of the mechanism not shown accommodated in the clip body 16. As the result of the foregoing operation the film 8 is stretched laterally, as in the conventional machine, thereby becoming the desired product.

Incidentally, when the turning resistance of the clip lever 10 becomes excessive owing to some causes and stronger than the repulsive force of the foregoing magnets, the disc 17 comes into contact with the clip lever 10 to turn forcibly the same, as in the conventional clip opener. Thus, even if there arise some unexpected causes, contact can be prevented from occurring between the permanent magnets 13 and 15 secured to the clip lever 10 and the clip opener 12, respectively. Although in the embodiment illustrated the respective magnets secured to the clip closer 11 and the clip opener 12 are shown as being the permanent magnets 14 and 15, these can be replaced individually by electromagnets.

In connection with the foregoing magnets, the following matters should be taken into consideration:

(1) Magnetic leakage being prevented.

(2) Magnetic field strength being strengthened to increase repulsive forces.

(3) Secular change of magnetization being prevented so as not to weaken repulsive forces even after long-term use.

Incidentally, in case the magnetic repulsive force is sufficiently large, it will be understood that the disc 17 may be omitted from the machine. Further, depending upon the design conditions, for example, in the case of the working speed being high, a member equivalent to the disc 17 can be added to the clip closer 11.

According to the fourth feature of the present invention described in detail hereinabove, as oscillation of the clip lever is effected by means of the repulsive force of the magnet, wear of the clip lever, clip closer, and clip opener can be eliminated completely, and noise ceases because no mutual contact exists. Further, abrasion powder resulting from contact is not generated, so that a clean condition is maintained and a film of high quality is produced.

Figure 24:
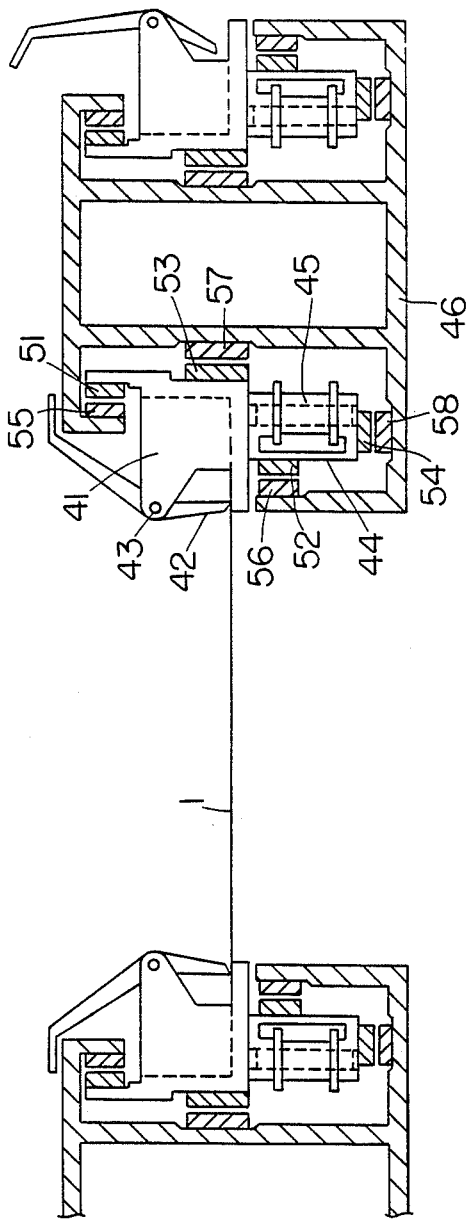
Figure 25:
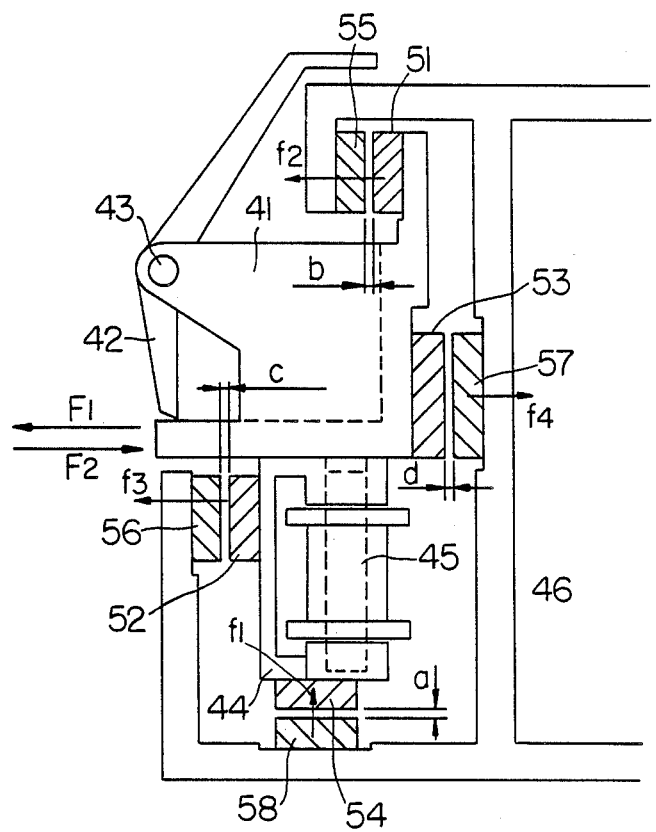

An embodiment according to the fifth feature of the present invention will now be described with reference to the drawings. FIGS. 24 and 25 show an embodiment of this feature which is a drawing machine comprising the rails 46 installed extending from the inlet section to the outlet section and returning from the outlet section back to the inlet section of such a drawing machine as shown in FIG. 5, and the clip propelling unit including the clip bodies 41 and clip bases 44 (made by aluminum alloy for reduction of weight), clip levers 42, etc. moving on the rails 46 for pinching and stretching, for example, the film 1. This embodiment has the following characteristics.

That is, magnetic substances 51, 52, and 53 and the permanent magnet 54 are attached to the clip body 41 and the clip base 44. Electromagnets 55, 56, 57, and 58 are attached to the rail 46 opposite to the magnetic substances 51, 52, and 53 and the permanent magnet 54, as the magnetic generating units. Combination of the magnetic substances 51, 52, and 53 and the electromagnets 55, 56, and 57 makes up magnetic field generating units for exerting lateral attractive forces, and combination of the permanent magnet 54 and the electromagnet 58 makes up a magnetic field generating unit for exerting a vertical repulsive force.

The clip body 41 and the clip base 44 are floated by means of the magnetic forces of the foregoing magnetic field generating units. The clip bases 44 are interlinked mutually by the roller chain 45 and driven by a driving system (not shown) so as to move on the rail 46 in synchronized relation between the left and the right sides. 43 is the pin for supporting rotatably the clip lever 42.

Describing now the action of the embodiment of the foregoing configuration, the clip lever 42 is lowered in the inlet section A (FIG. 5) of the drawing machine by a clip lever lowering unit (not shown) to pinch the film 1 in conjunction with the surface K (as in FIG. 6) of the clip body 41, and driven along the rail 46 in the direction of the arrow C of FIG. 5 by a driving unit (not shown) to stretch the film 1. Then, in the outlet section B (FIG. 5) of the drawing machine, the clip lever 42 is pushed up by a clip lever raising unit (not shown) to release the pinched state film 1.

During the above, the clip body 41 and the clip base 44 are floated by means of the magnetic generating units creating the combination of vertical repulsive fields and lateral attractive fields, and moved along the rail 46 in the non-contact state.

The equilibrium relation of the system formed by the magnetic generating units will now be described with reference to FIG. 25. The total weight of the movable portions (the floatable portions), such as the clip body 41, clip base 44, and roller chain 45, is floated by means of the repulsive force $f_1$ between the permanent magnet 54 and the electromagnet 58 to thereby form the gap a.

Attractive forces $f_2$, $f_3$, and $f_4$ are generated, respectively, between the magnetic substances 51, 52, and 53 and the electromagnets 55, 56, and 57. The system is designed so that the gaps b, c, and d are maintained at proper spacing, under the condition that the forces $F_1$, $F_2$, and $f_1$ are existing inclusively, by detecting the spacings b, c, and d by the use of known gap sensors (not shown), regulating the currents of the electromagnets 55, 56, and 57, and controlling automatically the attractive forces $f_2$, $f_3$, and $f_4$ of the electromagnets 55, 56, and 57.

In case some force acts on the clip body 41 in the direction of the arrow $F_1$ owing to the stretching action and the like or to the tension of the roller chain 45 appearing in the curved section of the rail, the system becomes balanced at the position where the resultant force of the force acting on the clip body and the attractive forces $f_2$ and $f_3$ generated by the electromagnets 55 and 56 equalizes with the attractive force $f_4$ generated by the electromagnet 57. At this time, the gaps b, c, and d are formed between these electromagnets and the magnetic substances 51, 52, and 53.

When the external force $F_1$ fluctuates, this can be amended by controlling the attractive forces $f_2$ and $f_3$ acting on the electromagnets 55 and 56 by the use of a control unit; as a result, always, the gaps b, c, and d are maintained properly, generation of a moment on the clip body 41 is prevented, and the gap a is maintained properly.

Further, in case some force acts on the clip body 41 in the direction of the arrow $F_2$ owing to the tension of the roller chain 45 and the like appearing in the curved section of the rail, the system becomes balanced at the position where the resultant force of the force acting on the clip body and the attractive force of the electromagnet 57 equalizes with the resultant force of the attractive forces $f_2$ and $f_3$ of the electromagnets 55 and 56. At this time, the gaps b, c, and d are formed between these electromagnets and the magnetic substances 51, 52, and 53. When the external force $F_2$ fluctuates, this can be amended through control of the control unit. That is, by making the resultant force of $F_2$ and the attractive force $f_4$ equalize with the resultant force of the attractive forces $f_2$ and $f_3$, the gaps b, c, and d are made proper, generation of a moment on the clip body 41 is prevented, and the gap a is maintained properly.

For reference, the foregoing control can be achieved through control of the electromagnets 55 and 56 only (in this case, the electromagnet 57 is replaced by a permanent magnet), or control of the electromagnet 57 only (in this case, the electromagnets 55 and 56 are replaced by permanent magnets).

In the foregoing embodiment, if the clip body 41 and clip base 44 are made of an aluminum alloy so as to form magnetic substances, the magnetic substances 51, 52, and 53 can be omitted.

Further, a permanent magnet may be used in place of the electromagnet 58.

Furthermore, in lieu of the repulsive field generated by the permanent magnet 54 and the electromagnet 58, an attractive field may be generated by a magnetic substance attached to the upper portion of a movable portion, such as the clip body 41, and an electromagnet or a permanent magnet provided on the side of the rail 46.

As described hereinabove, given that the clip according to the present invention is magnetically floated above the rail and operated in the non-contact state, there exists no foreign substance that is generated by lubrication and through sliding or rolling action; thus, the degree of cleanliness of the film being stretched is enhanced significantly. Further, no noise is generated as a result of sliding or rolling action; thus, the work environment is improved remarkably. Furthermore, no sliding resistance appears; thus, the present invention saves energy and is suited for highspeed operation.

We claim:

1. A horizontal drawing machine for pinching the selvage edges of a web-like film, continuously laterally stretching the film in a crosswise direction, and releasing the film after stretching, said machine comprising:
    rail means defining a film inlet section and a film outlet section, said rail means diverging from the film inlet section to the film outlet section;
    a clip-propelling unit for driving a plurality of clip means along said rail means;
    a plurality of clip means attached to said clip propelling unit for pinching the selvage edges of a web-like film and stretching the web-like film when said clip-propelling unit drives said plurality of clip means along said rail means from the film inlet section to the film outlet section;
    first magnet means on said plurality of clip means;
    second magnet means on said rail means in spaced opposed relation to said first magnet means;
    said first magnet means repelling said second magnet means for opposing the weight of said plurality of clip means and the weight and stretching force of the web-like film pinched thereby for floating said plurality of clip means spaced from said rail means for eliminating abraded particles generated when said plurality of clip means moves along said rail means;
    magnetically-actuated clips on each of said plurality of clip means, said magnetically-actuated clips being magnetically and mechanically actuatable;
    magnetic clip opening and closing means disposed along said rail means, and said magnetic clip opening and closing means having third magnet means for opening and closing said magnetically-actuated clips for pinching and releasing the web-like film when said plurality of clip means is moved along said rail means; and
    mechanical clip opening and closing means disposed along said rail means, said mechanical clip opening and closing means having a mechanical member for physically contacting said magnetically-actuated clips for opening and closing said magnetically-actuated clips for pinching and releasing the web-like film when said plurality of clip means is moved along said rail means and said magnetic clip opening and closing means has failed to open or close said magnetically-actuated clips.

2. A horizontal drawing machine for pinching the selvage edges of a web-like film, continuously laterally stretching the film in a crosswise direction, and releasing the film after stretching, said machine comprising:
    rail means defining a film inlet section and a film outlet section, said rail means diverging from the film inlet section to the film outlet section;
    a clip-propelling unit for driving a plurality of clip means along said rail means;
    a plurality of clip means attached to said clip propelling unit for pinching the selvage edges of a web-like film and stretching the web-like film when said clip-propelling unit drives said plurality of clip means along said rail means from the film inlet section to the film outlet section;
    permanent magnet means on said plurality of clip means;
    electromagnet means on said rail means in spaced opposed relation to said permanent magnet means;
    magnetically-actuated clips on each of said plurality of clip means, said magnetically-actuated clips being magnetically and mechanically actuable;
    magnetic clip opening and closing means disposed along said rail means, said magnetic clip opening and closing means having third magnet means for opening and closing said magnetically-actuated clips for pinching and releasing the web-like film when said plurality of clip means is moved along said rail means;
    mechanical clip opening and closing means disposed along said rail means, said mechanical clip opening and closing means having a mechanical member for physically contacting said magnetically actuated clips for opening and closing said magnetically-actuated clips for pinching and releasing the web-like film when said plurality of clip means is moved along said rail means and said magnetic clip opening and closing means has failed to open or close said magnetically-actuated clips; and
    means for varying the magnetic field of said electromagnet means for continuously compensating for the weight and stretching force of the web-like film and for the weight of said permanent magnet means and said plurality of clip means for floating said plurality of clip means spaced from said rail means for eliminating abraded particles generated when said plurality of clip means moves along said rail means, and said means for varying the magnetic field of said electromagnet means being connected to said electromagnet means.

* * * * *